United States Patent
Van Deventer et al.

(10) Patent No.: US 10,694,264 B2
(45) Date of Patent: Jun. 23, 2020

(54) CORRELATING TIMELINE INFORMATION BETWEEN MEDIA STREAMS

(71) Applicants: KONINKLIJKE KPN N.V., Rotterdam (NL); NEDERLANDSE ORGANISATIE VOOR TOEGEPAST-NATUURWETENS CHAPPELIJK ONDERZOEK TNO, 's-Gravenhage (NL)

(72) Inventors: Mattijs Oskar Van Deventer, Leidschendam (NL); Hans Maarten Stokking, Wateringen (NL); Ray Van Brandenburg, The Hague (NL)

(73) Assignees: KONINKLIJKE KPN N.V., Rotterdam (NL); Nederlandse Organisatie Voor Toegpast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 15/022,863

(22) PCT Filed: Sep. 5, 2014

(86) PCT No.: PCT/EP2014/068925
§ 371 (c)(1),
(2) Date: Mar. 17, 2016

(87) PCT Pub. No.: WO2015/039888
PCT Pub. Date: Mar. 26, 2015

(65) Prior Publication Data
US 2016/0234570 A1 Aug. 11, 2016

(30) Foreign Application Priority Data

Sep. 20, 2013 (EP) .................................. 13185405

(51) Int. Cl.
*H04N 21/845* (2011.01)
*H04N 21/8547* (2011.01)
(Continued)

(52) U.S. Cl.
CPC ..... *H04N 21/8547* (2013.01); *H04N 21/2387* (2013.01); *H04N 21/242* (2013.01);
(Continued)

(58) Field of Classification Search
CPC combination set(s) only.
See application file for complete search history.

(56) References Cited

U.S. PATENT DOCUMENTS

| 5,739,864 A | 4/1998 | Copeland et al. |
| 6,642,966 B1 | 11/2003 | Leamaje et al. |

(Continued)

FOREIGN PATENT DOCUMENTS

| CN | 101854319 A | 10/2010 |
| CN | 103177489 A | 6/2013 |

(Continued)

OTHER PUBLICATIONS

Transmittal of the International Search Report and the Written Opinion of the International Searching Authority for PCT/EP2014/068931, entitled "Correlating Timeline Information Between Media Streams," dated Dec. 1, 2014.

(Continued)

*Primary Examiner* — Hsiungfei Peng
(74) *Attorney, Agent, or Firm* — Hamilton, Brook, Smith & Reynolds, P.C.

(57) ABSTRACT

A system is provided for enabling correlating timeline information between a first media stream and a second media stream which are both associated with a common play-out timeline. The system comprises at least two stream monitors arranged for providing identification information (Continued)

for a media stream by obtaining a persistent identification of one or more media samples of the media stream, determining a timestamp value associated with the persistent identification, and providing the timestamp value and the persistent identification as the identification information. Furthermore, a correlation subsystem is provided for combining the identification information to enable correlating timeline information of the first media stream to timeline information of the second media stream by matching a first persistent identification of the first media stream to a second persistent identification of the second media stream and thereby matching a first timestamp value of the first media stream to a second timestamp value of the second media stream. The system enables media synchronization to be provided for a plurality of devices in a segment of a media distribution network with less computational complexity and/or bandwidth.

15 Claims, 5 Drawing Sheets

(51) Int. Cl.
  *H04N 21/8358* (2011.01)
  *H04N 21/43* (2011.01)
  *H04N 21/462* (2011.01)
  *H04N 21/2387* (2011.01)
  *H04N 21/242* (2011.01)

(52) U.S. Cl.
  CPC ..... *H04N 21/4307* (2013.01); *H04N 21/4622* (2013.01); *H04N 21/8358* (2013.01); *H04N 21/8456* (2013.01)

(56) References Cited

U.S. PATENT DOCUMENTS

| | | | |
|---|---|---|---|
| 8,358,376 B2* | 1/2013 | Oostveen | G10L 25/48 348/500 |
| 8,705,195 B2 | 4/2014 | Lockton | |
| 9,516,373 B1 | 12/2016 | Abecassis | |
| 9,860,581 B2 | 1/2018 | Stokking et al. | |
| 2002/0120925 A1 | 8/2002 | Logan | |
| 2004/0148159 A1 | 7/2004 | Crockett | |
| 2006/0156374 A1 | 7/2006 | Hu | |
| 2007/0110107 A1 | 5/2007 | Tighe et al. | |
| 2008/0062315 A1 | 3/2008 | Oostveen et al. | |
| 2008/0304389 A1 | 12/2008 | Den Hollander | |
| 2009/0055417 A1* | 2/2009 | Hannuksela | G06F 17/30858 |
| 2012/0019352 A1 | 1/2012 | Menard et al. | |
| 2015/0100981 A1* | 4/2015 | Gao | H04N 21/435 725/32 |
| 2016/0234542 A1 | 8/2016 | Stokking et al. | |

FOREIGN PATENT DOCUMENTS

| | | |
|---|---|---|
| EP | 773 072 A1 | 4/2007 |
| JP | 2003 259314 | 9/2003 |
| JP | 2006-528859 A | 12/2006 |
| JP | 2007 208345 | 8/2007 |
| JP | 2011-501931 A | 1/2011 |
| JP | 2012-520648 A | 9/2012 |
| WO | WO 2005/011281 A1 | 2/2005 |
| WO | WO 2007/072326 A2 | 6/2007 |
| WO | WO 2009/053072 | 4/2009 |
| WO | WO 2010/106075 A1 | 9/2010 |
| WO | WO 2015/039888 A1 | 3/2015 |
| WO | WO 2015/0398910 A1 | 3/2015 |

OTHER PUBLICATIONS

Extended European Search Report for EP Application No. 13185428.3, dated Feb. 19, 2014.
Non-Final Office Action for U.S. Appl. No. 15/022,851, entitled: Correlating Timeline Information Between Media Streams, dated Dec. 19, 2016.
Stokking H M et al: "IPTV inter-destination synchronization: A network-based approach", Intelligence in Next Generation Networks (ICIN). 2010 14th International Conference on. IEEE. Piscataway. NJ. USA. pp. 1-6 (2010).
Transmittal of the International Search Report and the Written Opinion of the International Searching Authority for PCT/EP2014/068925, entitled "Correlating Timeline Information Between Media Streams," dated Dec. 1, 2014.
Boronat, F., et al., "Multimedia Group and Inter-Stream Synchronization Techniques: A Comparative Study," *Information Systems*, 34: 108-131 (2009).
Extended European Search Report for corresponding EP Application No. 13185405.1, dated Feb. 19, 2014.
Notice of Allowance for U.S. Appl. No. 15/022,851, entitled: Correlating Timeline Information Between Media Streams, dated Jun. 14, 2017.
Notice of Allowance for U.S. Appl. No. 15/022,851, entitled: Correlating Timeline Information Between Media Streams, dated Nov. 15, 2017.

* cited by examiner

CORRELATING TIMELINE INFORMATION BETWEEN MEDIA STREAMS

This application is the U.S. National Stage of International Application No. PCT/EP2014/068925, filed Sep. 5, 2014, which designates the U.S., published in English, and claims priority under 35 U.S.C. §§ 119 or 365(c) to EP Application No. 13185405.1, filed Sep. 20, 2013. The entire teachings of the above applications are incorporated herein by reference.

FIELD OF THE INVENTION

The invention relates to a system and method for correlating timeline information between a first media stream and a second media stream. The invention further relates to a media distribution network comprising the system, to a stream monitor or correlation subsystem as used in the system and to a computer program product comprising instructions for causing a processor system to perform the method. The invention further relates to a synchronization client.

BACKGROUND ART

Media content such as video content and audio content is commonly delivered to users in a digital form. If media content has a temporal aspect, and in particular is associated with a timeline which indicates how the media content is to be played out over time, such digital form is typically referred to as a media stream. Media streams may be delivered to a receiver of a user via a media distribution network. In particular, a media stream may be streamed to the receiver, which allows the receiver to begin play-out of the media stream before having received the entire media stream. However, the media stream may also delivered to the receiver of the user in a non-streaming manner, e.g., by being delivered to the receiver in the form of a file.

Examples of media streams include video streams such as camera-recorded or computer-rendered streams, audio streams such as microphone-recorded streams, timed text streams such as subtitle streams or social-media streams, timed events streams which show an advertisement image or perform an action at the receiver, and multimedia streams comprising different types of media streams.

Different media streams may be associated with a common play-out timeline in that there may be a temporal relationship between the media streams. In particular, media streams may be meant to be played out in a synchronized manner. This may be the case if the media streams concern different recordings of a same event, e.g., with a first media stream being a video stream and a second media stream being an audio stream, or the first media stream being a video stream representing a recording of the event from a first camera angle and the second media stream being also a video stream but representing a recording from a different camera angle.

Accordingly, there may be a need to enable play-out of different media streams in a synchronized manner. In addition, there may be a need to enable play-out of a same, similar or different media stream in a synchronized manner, e.g., across different receivers. The following are known examples where such media synchronization may be employed:

Social TV, in which synchronizing of a same or similar media streams across multiple TVs or other devices of multiple users is desired. The same or similar media streams may include technical variations of the same stream, but they may also include streams of a same event which nevertheless constitute different content, such as recordings from different camera angles of the same event.

Hybrid TV, in which synchronizing of multiple media streams, potentially coming via multiple routes, to a single TV is desired. Such multiple routes may include, e.g., Digital Video Broadcast (DVB), Internet Protocol (IP) multicast and IP unicast.

Companion screen, in which synchronizing a same or a different media stream between a TV and a companion screen, e.g., a tablet device, is desired. It is noted that the term 'companion screen' is also known as second screen.

It is noted that the above examples primarily refer to television, but that similar examples exist for other types of devices or receivers. Moreover, in the above examples, some or all of the media streams may be real-time or quasi-real time media streams. Additionally or alternatively, some or all of the media streams may be cached, e.g., by the media distribution network, or recorded, e.g., by a Personal Video Recorder (PVR), or constitute so-termed catch-up TV or user trick-mode media streams.

Broadcasters may employ media synchronization to offer synchronized services, where users can combine media streams via multiple routes and/or on multiple devices in various broadcaster-offered combinations. Such synchronization may take place in a studio system of the broadcaster where all media streams come together. Also, value-added-service providers may employ media synchronization to offer value-added synchronization services. Examples of value-added media streams include media streams which provide commenting, subtitling, audio description or sign-language interpretation of another media stream, e.g., a broadcasted video stream.

A problem associated with media synchronization may be that, whereas different media streams may be synchronized at the broadcaster or third party, they may lose their synchronicity while being distributed to the end user. For example, media streams may delivered via different routes. These routes have different delays because of differences in distance (transmission speed), multiplexing and routing (buffers), cached and recorded delivery, signal processing (e.g. mixing, transcoding), etc. Similarly, in the case of a value-added-service provider, the value-added media stream may be delivered from the service provider, while the original broadcast stream may be delivered from the broadcaster, i.e., via a different route.

An article "*Multimedia group and inter-stream synchronization techniques: A comparative study*" by F. Boronat et al., Elsevier Information Systems, 34, 2009, pp. 108-131, provides a comprehensive overview of known inter-destination synchronization techniques, i.e., synchronization between different end-terminals.

Most of the referenced inter-destination synchronization techniques make use of timeline information which is comprised in the media stream. Here, the term 'timeline information' refers to metadata which enables a receiver to play-out media samples of the media stream according to a play-out timeline. For example, if the media stream is delivered via the Real-time Transport Protocol (RTP), i.e., constitutes a RTP media stream, timeline information such as a RTP timestamp may be used. Other examples of timeline information include the so-termed Program Clock Reference (PCR), Presentation Time Stamp (PTS) and Decode Time Stamp (DTS). By comparing such timeline information across different receivers, appropriate stream adjustments may be calculated. To enable such comparing across receivers, synchronized wall-clocks may be used on the receivers, or alternatively, high-quality signaling connections with little and/or known delays. For example, a delay of the play-out time of the media stream may be achieved by buffering the media stream at the receiver.

It has been recognized that media streams may lose their original timeline information in a media distribution network. Such media distribution networks are typically owned by cable operators, telecom operators and internet service providers, which are typically different from the broadcasters or value-added-service providers. In such media distribution networks, a media stream may be modified in head-ends in order to make the media stream suited for distribution over the networks. These networks may be, e.g., DVB based (DVB-T, DVB-C, DVB-H), IP based (RTP/RTCP, IP multicast, IP unicast). Different codecs (MPEG 2, H.264, HEVC), transport technologies (broadcast, streaming, progressive download, adaptive streaming), etc, may be used in the final delivery of the media stream. During one or more of these processes, the media stream may be stripped of its original metadata. As a result, the original timeline information may not be included in the modified media stream. Instead, new metadata may be included which may include new timeline information.

Examples of such modifying of a media stream include:

(Re-)multiplexing. Most multiplexers for MPEG TS (Transport Stream) generate new PCR/PTS/DTS values while multiplexing. Typically, however, only the absolute values of PCR/PTS/DTS are changed, whereas their relationship across the media streams is maintained. As such, audio-video lip sync may be preserved.

Transcoding and re-encoding. Here, all relationships between incoming and outgoing media samples may be lost. For example, in case of a video stream, frames of the video stream may become a different type, e.g. from I-frame to B-frame. In addition, if the frame-rate changes during transcoding and re-encoding, the one-to-one relationship between incoming and outgoing frames may be lost. Furthermore, the whole container of the media stream may be changed, e.g. from so-termed TS to ISOBFF, thereby changing also the type of timeline information.

Technical or business reasons. Media distribution networks may refuse to pass timeline information. For instance, a DVB Synchronized Auxiliary Data Packet Identifier (SAD-PID) may be stripped from a Transport Stream (TS) by default. This may be on purpose, e.g. for said business reasons, or the parameter may just not be supported by the current network, thereby constituting a technical reason.

In addition to media streams being modified and thereby losing their original timeline information, such timeline information may also inherently differ between different media streams which are intended to be played synchronously but which are already initially, e.g., at a media stream origination, not provided with common timeline information. Also here there may be a need for media synchronization.

WO 2010106075 A1 describes a method and a system for inter-destination media synchronization of at least a first and a second (media) stream, wherein the second stream is the output stream of a stream modification unit using the first stream as an input stream. The method comprises the steps of: providing first arrival time information of a packet in the first stream arriving at a first synchronization point and second arrival time information of a packet in the second stream arriving at a second synchronization point; providing synchronization correlation information on the synchronicity relationship between said input stream and said output stream; and, calculating delay information on the basis of the first and second arrival time information and the synchronization correlation information.

SUMMARY OF THE INVENTION

Although WO 2010106075 A1 enables inter-destination media synchronization between modified and unmodified media streams or between two differently modified streams, it would be advantageous to provide a system or method which further improves on at least one aspect of said media synchronization.

A first aspect of the invention provides a system for enabling correlating timeline information between a first media stream and a second media stream, the first media stream and the second media stream being both associated with a common play-out timeline, and the system comprising:

at least two stream monitors, each of said stream monitors being arranged for providing identification information for a media stream by:
i) obtaining a persistent identification of one or more media samples of the media stream, the persistent identification being data which can be reproducibly obtained using the media stream,
ii) determining a timestamp value associated with the persistent identification from timeline information comprised in the media stream, and
iii) providing the timestamp value and the persistent identification of the one or more media samples as the identification information;
wherein the at least two stream monitors comprise a first stream monitor for providing first identification information for the first media stream and a second stream monitor for providing second identification information for the second media stream; and
a correlation subsystem for combining the first identification information with the second identification information to enable correlating timeline information of the first media stream to timeline information of the second media stream by matching a first persistent identification of the first media stream to a second persistent identification of the second media stream and thereby matching a first timestamp value of the first media stream to a second timestamp value of the second media stream.

Embodiments are defined in the dependent claims.

The above measures provide a system which comprises at least two stream monitors. Each of the two stream monitors provides identification information for a different media stream, namely a first media stream and a second media stream. In order to provide the identification information, each stream monitor obtains a persistent identification of one or more media samples of the respective media stream. Here, the term 'persistent identification' refers to data which may be reproducibly obtained using the media stream. Examples of persistent identifications include fingerprints, watermarks as well as markers which are included in a persistent manner in the media stream. It will be appreciated that such identifications may be persistent in that they may be robust against various processing to which the media stream may be subjected during distribution of the media stream, e.g., via a media distribution network. Each stream monitor further determines a timestamp value which is associated with the persistent identification of the one or more media samples and thus with said media sample(s) itself or themselves. The timestamp value is determined from timeline information which may be comprised in the respective media stream, such as presentation timestamps or RTP timestamps.

Accordingly, the first stream monitor provides at least a first persistent identification of one or more media samples of the first media stream as well as an associated first timestamp value obtained from first timeline information of the first media stream, while the second stream monitor provides at least a second persistent identification of one or more media samples of the second media stream as well as an associated second timestamp value obtained from second timeline information of the second media stream.

Furthermore, a correlation subsystem is provided which obtains and subsequently combines the first identification information obtained from the first stream monitor with the second identification information obtained from the second stream monitor. The correlation subsystem is thus provided with at least the first persistent identification and its associated first timestamp value and the second persistent identification and its associated second timestamp value. Since both media streams are associated with a common play-out timeline, there may be a need to play-out or otherwise process both media streams in a synchronized manner. However, both media streams may comprise different timeline information, e.g., by having different timestamp values for the same location, i.e., same part of the content, in the stream.

The above measures enable correlating such different timeline information between the first media stream and the second media stream. Here, the term 'correlating' refers to the system enabling the timeline information of the first media stream to be related to the timeline information of the second media stream. Accordingly, timestamps or other timing data from the timeline information of the first media stream may be related to timing data from the timeline information of the second media stream, and vice versa. This is possible as the combined first identification information and second identification information enables the matching of a first persistent identification of the first media stream to a second persistent identification of the second media stream. Here, the term 'matching' refers to the first persistent identification being related with the second persistent identification. Such matching may be direct, e.g., based on a similarity in their characteristics, or indirect, e.g., based on their relative position on the common play-out timeline. In particular, the matching may be a matching in time in that both persistent identifications may be related in time, e.g., with respect to the common play-out timeline. For example, if both persistent identifications comprise a same fingerprint, this may indicate that both persistent identifications relate to a same play-out time on the common play-out timeline.

As an inherent result of the first persistent identification having been matched to the second persistent identification, the respective associated timestamp values have also been matched to each other. As such, the timeline information of the first media stream may be correlated to the timeline information of the second media stream in that said matching enables at least the first timestamp value to be correlated to the second timestamp value, with said correlation being typically generalize-able to enable the correlation of the entire timeline information between both media streams. Accordingly, after having matched persistent identifications of the respective media streams once or a limited number of times, the timeline information of both media streams can be directly correlated, i.e., without further use of persistent identifications.

The inventors have recognized the following. Obtaining a persistent identification of one or more media samples of a media stream may be relatively computationally complex compared to determining a timestamp value from timeline information comprised in the media stream. Similarly, a persistent identification may require more bandwidth to transmit than a timestamp value. As such, it may be disadvantageous to require all devices to which media synchronization is to be applied to provide such persistent identifications. However, the inventors have recognized that groups of such devices may have access to a same version of a first media stream in that it comprises same timeline information. For example, a group of devices may be located in a same segment of a media distribution network. Here, the term segment refers to a portion of the media distribution network across which a media stream is distributed by comprising, at a first boundary, an input for the media stream and, at a second boundary, at least one output or end-point for the media stream, with the media stream at the input and output being essentially the same. As such, the timeline information of the media stream is maintained during distribution across the segment.

Even though media synchronization between a first group of devices in a first segment and a second group of devices in a second segment on the basis of only timeline information may be unreliable for the earlier mentioned reasons, the present invention enables such media synchronization by providing a first stream monitor providing first identification information for the first media stream, e.g., placed in the first segment, and a second stream monitor for providing second identification information for the second media stream, e.g., placed in the second segment. It is therefore not necessary for all the devices within the first segment and/or second segment to obtain and provide such persistent identifications. Rather, after having combined the first identification information with the second identification information, media synchronization may be subsequently provided between both segments, i.e., on the devices in both segments, on the basis of said devices providing timeline information of the respective media streams which may then be correlated by the correlation subsystem to the timeline information of the other media stream.

As such, the present invention may enable synchronizing of media streams with previously unrelated timestamps, either on one device to provide inter-stream synchronization or lip-sync, or between devices to provide either inter-stream and inter-device synchronization, such as companion screen synchronization, or inter-destination synchronization. In particular, the present invention may enable media synchronization between a first media stream and a second media stream on the basis of timeline information of the respective media streams without the unreliability typically associated with such media synchronization due to the fact that the timeline information may be not directly relatable between such media streams. A further advantage may be that devices to which such media synchronization is to be applied may not need to provide persistent identifications. Rather, such devices may suffice with providing timeline information of a media stream, such as a timestamp associated with a current media sample of the media stream. As such, less bandwidth and/or less computational complexity is required to effect the media synchronization across a group of devices.

In an embodiment, the second media stream may be a modified version of the first media stream, said modified version comprising timeline information which differs from the timeline information of the first media stream. The system may be used to enable correlating timeline information between a first media stream and a modified version of the first media stream. Such modifications may frequently occur during distribution of media streams. Accordingly, the system may enable media synchronization of a modified version of the first media stream on the basis of the timeline information of the (unmodified) first media stream since use is made of persistent identifications which are reproducible from both the unmodified as well as the modified version of the first media stream, i.e., are resistant to such modifications.

In an embodiment, the first media stream may be distributed via a media distribution network, the media distribution network may comprise a stream modifier for generating the modified version of the first media stream, and the first stream monitor may be comprised in the media distribution network upstream of the stream modifier and the second stream monitor may be comprised in the media distribution network downstream of the stream modifier. Stream modifiers, such as (re-)multiplexers, transcoders and re-encoders may cause the timeline information of the first media stream to be modified or replaced, in both cases establishing new timeline information. By being placed along the media distribution network, the stream modifier effectively establishes an upstream segment of the media distribution network, i.e., via which the first media stream is distributed, and a downstream segment of the media distribution network, i.e., via which the modified version of the first media stream is distributed. By providing the first stream monitor in the upstream segment and the second stream monitor in the downstream segment, media synchronization between both segments is enabled in that timeline information from the first media stream may be correlated to timeline information from the modified version of the first media stream. Accordingly, media synchronization of the modified version of first media stream is enabled on the basis of timeline information of the (unmodified) first media stream. An advantage of this embodiment may be that synchronization actions, such as triggering of an application on a receiver, which are frequently defined with respect to the timeline information of the media stream at the media stream origination, e.g., the broadcaster, may be applied to modified versions of such media streams as well.

In an embodiment, the correlation subsystem may be arranged for matching the first persistent identification to the second persistent identification based on third identification information linking the first persistent identification and the second persistent identification to the common play-out timeline. Accordingly, the correlation subsystem may relate the first persistent identification to the second persistent identification via the common play-out timeline. For example, the correlation subsystem may use the third identification information to match the first persistent identification to a first play-out time on the common play-out timeline and the second persistent identification to a second play-out time on the common play-out timeline. For that purpose, the third identification information may comprise, e.g., a plurality of persistent identifications and an associated plurality of play-out times on the common play-out timeline. As an inherent result of said matching, the respective associated timestamp values have also been matched to the respective play-out times on the common play-out timeline. Accordingly, if the first play-out time differs from the second play-out time, the correlation subsystem may take this difference into account when correlating the first timeline information to the second timeline information. An advantage of this embodiment may be that the first persistent identification may be matched to the second persistent identification even if both persistent identifications differ from each other, as may be the case if the first media stream and the second media stream are different types of media streams or both persistent identifications have been obtained at different play-out times of a same or similar, in terms of content, media stream.

In an embodiment, the first media stream and the second media stream may be part of a composite of media streams comprising common timeline information, and the system may further comprise a third stream monitor for providing said third identification information for the composite of media streams. Here, the term 'composite of media streams' refers to media streams being purposefully associated with a common play-out timeline, thereby forming such a composite of media streams. It is noted that the composite of media streams may, but may also not be, distributed in the form of a composite media stream. Here, the term 'composite media stream' refers to a media stream which is comprised of, i.e., composited by, two or more media streams. The composite of media streams may comprise common timeline information in that, during distribution, at least one of the media streams comprises timeline information which may serve to establish the common play-out timeline of the composite of media streams. For example, the third stream monitor may be provided near an origination of the composite of media streams in the media distribution network and may provide identification information to the system comprising a plurality of persistent identifications for each of the media streams and an associated plurality of play-out times on the common play-out timeline. By providing a third stream monitor which provides said third identification information, the system may link the first persistent identification and the second persistent identification to the common play-out timeline.

In an embodiment, the second media stream may be distributed via a media distribution network, the media distribution network may further comprise a synchronization subsystem for performing a synchronization action with respect to the second media stream, and the correlation subsystem may be arranged for providing timing information for enabling the synchronization subsystem to perform the synchronization action based on the timeline information of the first media stream. Here, the synchronization subsystem is a 'subsystem' in that it may, but may not have to be part of the media distribution network and/or the system as claimed. The correlation subsystem may interact with entities of the synchronization subsystem to enable a synchronization action to be performed with respect to the second media stream on the basis of the timeline information of the first media stream. It will be appreciated that such interaction may take various forms, such as a query-response type of interaction in which an entity of the synchronization subsystem provides a query comprising a timestamp from the timeline information of the second media stream and the correlation subsystem provide a response in the form of timing information which comprises a timestamp from the timeline information of the first media stream which relates to a same play-out time on the common play-out timeline. Here, the timing information may thus constitute an output of the correlation subsystem. The timing information is obtainable by the correlation subsystem by correlating the timeline information between the first media stream and the second media stream. The format of such query-response type of interaction may be specified by, e.g., an Application Programming Interface (API). Effectively, the correlation subsystem may provide a translation service for entities of the synchronization subsystem, the translation service comprising translating timestamps and other timing data from timeline information of the second media stream to the timeline information of the first media stream.

In an embodiment, the synchronization action may be one of the group of:
- a media stream buffering or skipping ahead to enable synchronized playback of the first media stream and/or the second media stream on a plurality of receivers,
- a media stream buffering or skipping ahead to enable synchronized playback of the first media stream with the second media stream on a receiver, and
- a triggering of an application on a receiver in synchronization with a media stream play-out on the receiver.

Synchronization actions with respect to media stream buffering or skipping ahead may be desirable in order to effect media synchronization in the earlier mentioned Social TV scenario in which synchronizing of a same or similar media streams across multiple receivers of multiple users is desired, in the Hybrid TV scenario in which synchronizing of different media streams to a single receiver is desired, and in the companion screen scenario in which synchronizing a same or a different media stream between a TV receiver and a companion screen is desired. It is noted that the media stream buffering may be, but may not need to be, effected on the receiver itself, i.e., using an internal synchronization client. For example, the media stream buffering or skipping ahead may also be performed by a synchronization client which is comprised in the media distribution network upstream of the receiver. Synchronization actions with respect to a triggering to an application may be desirable to effect synchronized presentation of quiz questions, advertisements, etc, or trigger the application to perform other types of actions.

In an embodiment, the synchronization subsystem may comprise a synchronization server and a plurality of synchronization clients, wherein the plurality of synchronization clients may be comprised in a segment of the media distribution network which is arranged for distributing the second media stream, and wherein the second stream monitor may be comprised in the segment amongst the plurality of synchronization clients. Here, the term 'synchronization server' refers to an entity in the synchronization subsystem which cooperates with synchronization clients to effect the media synchronization in accordance with a client-server model, i.e., in a distributed manner. In particular, each of the plurality of synchronization clients may be included in a receiver of an end-user, whereas the synchronization server may be provided outside of said receivers to enable orchestrating the media synchronization across a plurality of receivers. The synchronization server may comprise the correlation subsystem according to the present invention so as to provide a similar functionality to the synchronization client as the Media Synchronization Application Server (MSAS) described in WO 2010106075 A1, in particular in paragraph [0073] and further. An advantage of this embodiment may be that, since the second media stream is distributed across the segment, only one or a limited number of stream monitors may be needed within the segment to enable correlating the timing information across the segment with the timing information of the first media stream. A limited number of stream monitors may be for backup reasons. As such, it may not be needed for each receiver to include a stream monitor. Rather, only one receiver may comprise a stream monitor, or only one stream monitor may need be included as a separate, i.e., stand-alone, entity in the segment. Alternatively, a segment may include a plurality of stream monitors, but with only one of the stream monitors having to be activated.

In an embodiment, the correlation subsystem may be arranged for providing the timing information to the plurality of synchronization clients in the segment for enabling said synchronization clients to perform the synchronization action with respect to the second media stream based on a monitoring of the second media stream by the second stream monitor. Accordingly, media synchronization may be employed across a plurality of synchronization clients on the basis of the monitoring of the second media stream by only one or a limited number of the stream monitors. For example, the media synchronization may be employed across a plurality of receivers which each comprise one of the synchronization clients and which are located in a same segment of a media distribution network, e.g., downstream of a same head-end, with only one or a limited number of the receivers having to provide the identification information and thus having to support the relatively higher computational complexity and/or higher bandwidth.

In an embodiment, the persistent identification may be one of the group of: a fingerprint, a watermark and a marker, of the one or more media samples. Fingerprints and watermarks are well known for their ability to provide a persistent identifications of one or more media samples of a media stream as each yields data which can be reproducibly obtained from the media stream during distribution of the media stream. Also markers which are included in the media stream in a persistent manner enable such data to be reproducibly obtained from the media stream during said distribution.

In an embodiment, the media distribution network may comprise a head-end downstream of the stream modifier, and the second stream monitor may be comprised in or downstream of the head-end. Here, the term 'head-end' refers to a functional entity in the media distribution network which acts as a distribution point for a plurality of devices, such as a plurality of receivers of respective end users. By providing the second stream monitor in or downstream of the head-end, the timeline information of the modified version of the first media stream which is being distributed via the head-end can be correlated to the timeline information of the (unmodified) first media stream. Accordingly, media synchronization may be enabled for all devices which obtain the modified version of the first media stream via the head-end. In particular, if the media distribution network downstream of the head-end is considered as a segment, media synchronization may be enabled for all devices within the segment based on only a single or limited number of stream monitors being placed within said segment, thereby enabling synchronization with devices outside the segment, i.e., in other segments, or with streams previously only related in time with the (unmodified) first stream.

In another aspect of the present invention, a media distribution network may comprise the system.

In another aspect of the present invention, a stream monitor and/or correlation subsystem may be provided as used in the system.

In another aspect of the present invention, a synchronization client may be provided for use with the system, wherein the synchronization client may be arranged for identifying the segment in which the synchronization client is comprised to the correlation subsystem. The correlation subsystem may be arranged for providing timing information for use in different segments of the media distribution network based on different identification information which is received from stream monitors comprised in the different segments. By identifying the segment in which the synchronization client is comprised, e.g., by reporting a manually configured parameter, a parameter from an Electronic Program Guide (EPG), a parameter from the received stream, etc, the correlation subsystem is enabled to provide the appropriate timing information to the synchronization client, i.e., which is based on the identification information of a stream monitor which is comprised in the same segment as the synchronization client.

In another aspect of the present invention, a method is provided for enabling correlating timeline information between a first media stream and a second media stream, the first media stream and the second media stream being both associated with a common play-out timeline, said correlating being based on identification information obtained from at least two stream monitors, each of said stream monitors being arranged for providing identification information for a media stream by:

i) obtaining a persistent identification of one or more media samples of the media stream, the persistent identification being data which can be reproducibly obtained using the media stream, ii) determining a timestamp value associated with the persistent identification from timeline information comprised in the media stream, and iii) providing the timestamp value and the persistent identification of the one or more media samples as the identification information;

and the method comprising:

obtaining first identification information for the first media stream from a first stream monitor of the at least two stream monitors;

obtaining second identification information for the second media stream from a second stream monitor of the at least two stream monitors;

combining the first identification information with the second identification information to enable correlating timeline information of the first media stream to timeline information of the second media stream by matching a first persistent identification of the first media stream to a second persistent identification of the second media stream and thereby matching a first timestamp value of the first media stream to a second timestamp value of the second media stream.

In another aspect of the present invention, a computer program product may be provided comprising instructions for causing a processor system to perform the method.

It will be appreciated by those skilled in the art that two or more of the above-mentioned embodiments, implementations, and/or aspects of the invention may be combined in any way deemed useful.

Modifications and variations of the method and/or the computer program product, which correspond to the described modifications and variations of the system, can be carried out by a person skilled in the art on the basis of the present description.

The invention is defined in the independent claims. Advantageous yet optional embodiments are defined in the dependent claims.

BRIEF DESCRIPTION OF THE DRAWINGS

These and other aspects of the invention are apparent from and will be elucidated with reference to the embodiments described hereinafter. In the drawings.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION OF EMBODIMENTS

Figure 1:
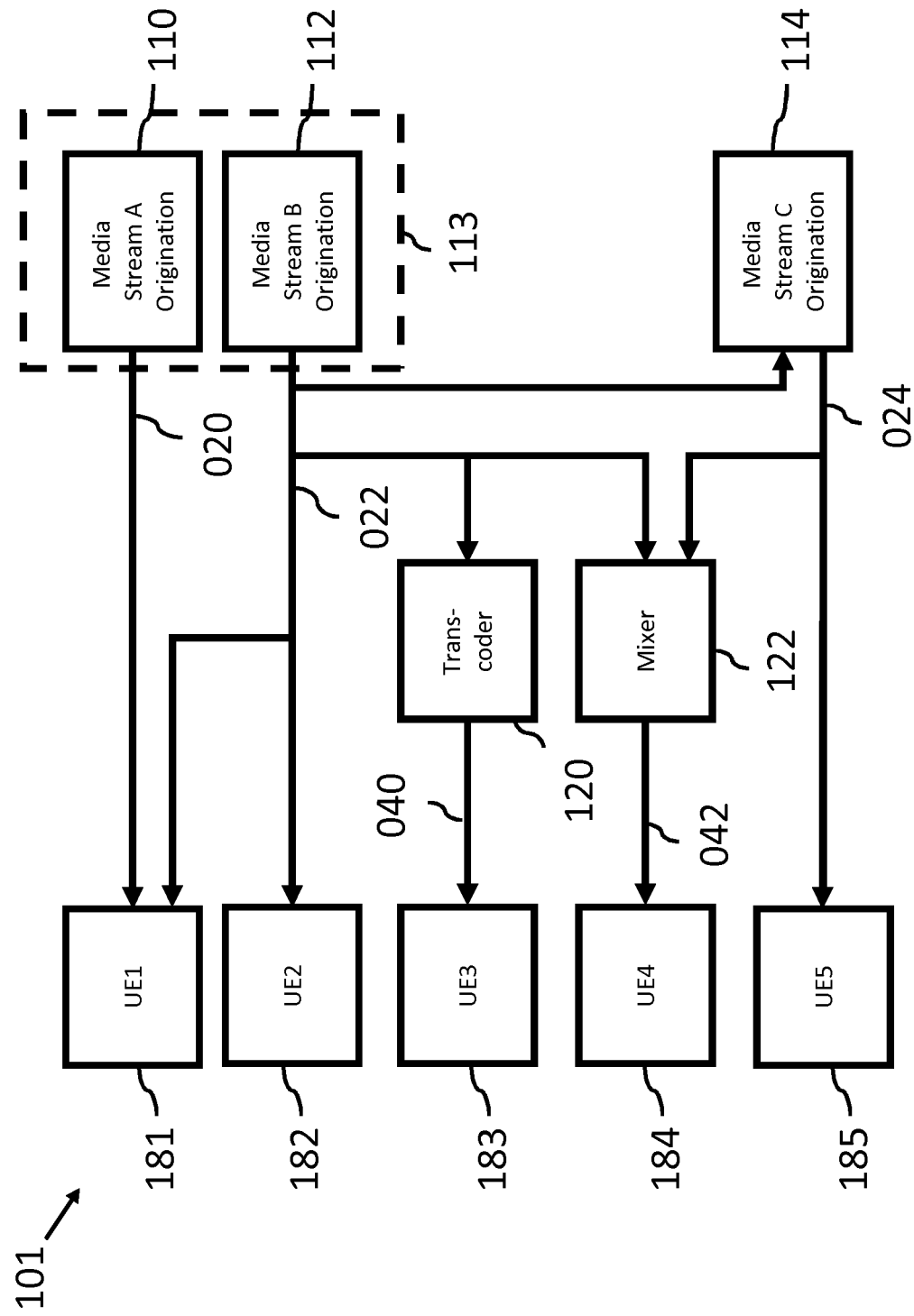
FIG. 1 illustrates a number of use-cases for media synchronization.

FIG. 1 shows a media distribution network 101 in which a plurality of media streams 020-024 are delivered to various User Equipment (UE) 181-185. Here, the term User Equipment refers to a device of an end-user which is arranged for receiving and typically also playing-out one or more media streams. Such a device is also referred to as a receiver, terminal or end-terminal. FIG. 1 illustrates various use-cases of media synchronization in general, in that the media stream A 020 and media stream B 022, originating from a media stream A originator 110 and a media stream B originator 112, respectively, may provide two different camera views, whereas media stream C originator 114 may be from a value-added-service provider providing a media stream C 024 in the form of, e.g., a commentator audio stream. For example, the commentator may be viewing media stream B 022 and providing his or her comments using media stream C 024.

The media distribution network 101 is shown to comprise stream modifiers 120, 122 in the form of a transcoder 120 and a multiplexer 122, in short also referred to as mixer. The transcoder 120 is shown to transcode media stream B 022, thereby providing a transcoded version of media stream B 040, whereas the multiplexer 122 is shown to multiplex media stream B 022 with media stream C 024, thereby establishing a mixed media stream 042. The above media streams 020-042 are shown to be delivered to various user equipment to illustrate following use-cases Hybrid TV Use-Cases:

1. UE1 181 may be a hybrid TV which receives a main broadcast media stream as a DVB stream from media stream originator 1 and receives an ancillary media stream as MPEG-DASH stream from media stream originator 2.

2. UE1 181 may also be a hybrid TV which receives a main broadcast media stream as a DVB stream from media stream originator 1 and receives an ancillary media stream as RTP/IP stream from media stream originator 2.

3. UE1 181 may also be a hybrid TV which receives the main media stream as an Internet Protocol TV (IPTV) multicast stream from media stream originator 1 and receives an ancillary media stream as RTP/IP stream from media stream originator 2.

Social TV Use-Cases:

1. UE2 182 and UE3 183 may be two TVs used for social TV. UE2 may receive a media stream from media stream originator 2 while UE3 may receive a transcoded version of the same media stream.

2. UE2 182 and UE4 184 may be two TVs used for social TV. UE4 may receive a mixed media stream that combines media streams from media stream originators 2 and 3.

Companion Screen Use-Cases:

1. UE2 182 may be a TV and UE3 183 may be a tablet device. One media stream may be played on the TV and a transcoded version of that media stream may be played on the tablet device.

2. UE2 182 may be a TV and UE5 185 may be a tablet device. One media stream may be played on the TV and a different media stream on the tablet device.

The present invention may be applied to the above described use-cases to enable media synchronization between two or more of the media streams, with the present invention itself being further described with reference to FIGS. 2-5.

Figure 2:
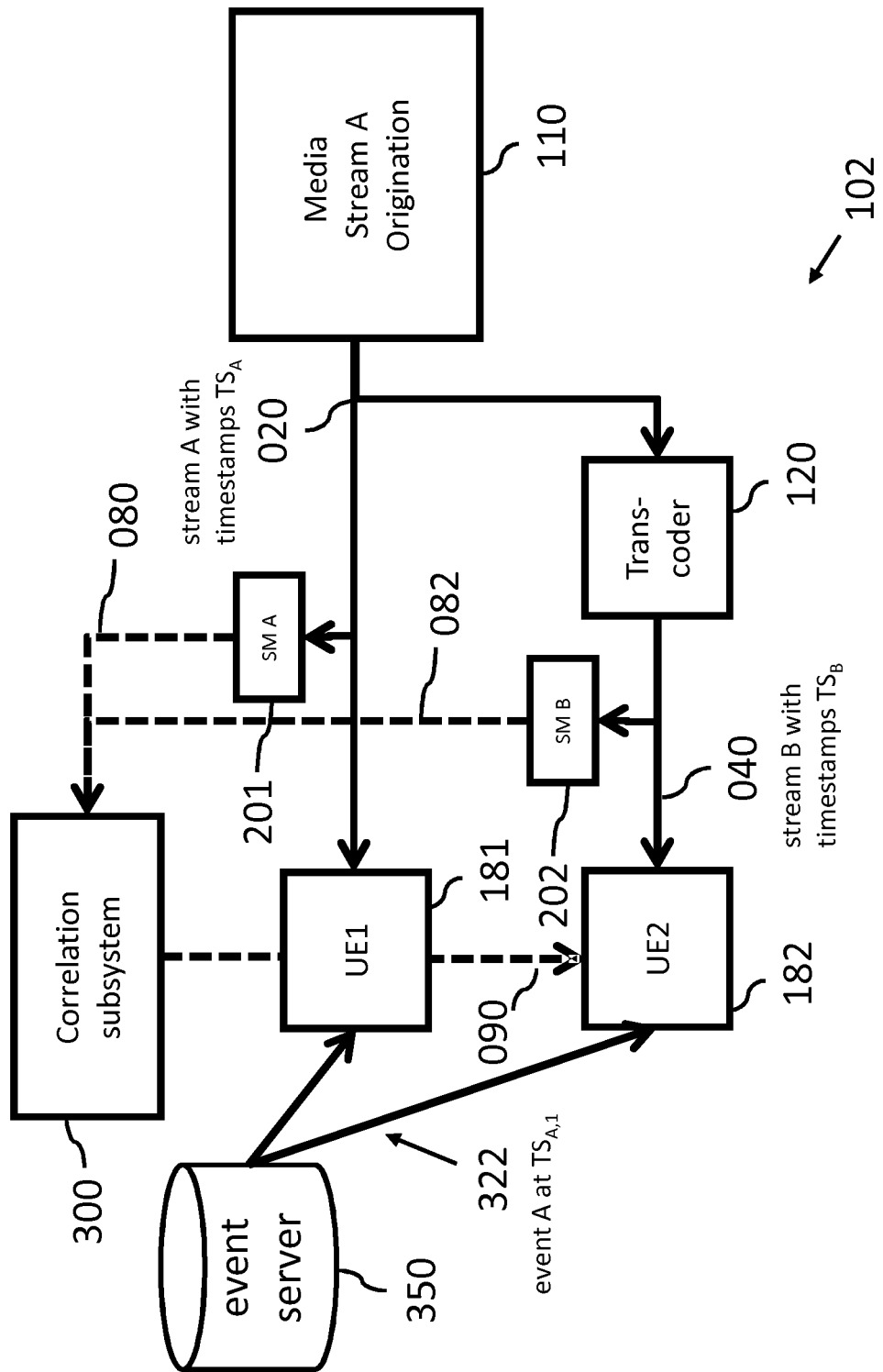
FIG. 2 shows a media distribution network comprising a stream modifier and a system according to the present invention which correlates timeline information between a modified version of a stream and the (unmodified) stream.

FIG. 2 shows a first embodiment in accordance with the present invention. Here, a media distribution network 102 is shown comprising a media stream originator A 110 which provides a media stream A 020 comprising timeline information in the form of timestamps $TS_A$. The media stream A 020 is shown to be delivered to UE1 181 and to a stream modifier 120 in the form of a transcoder 120. The transcoder 120 is shown to transcode the media stream A 020 to generate a transcoded version of a media stream A, in short media stream B 40, comprising new timeline information in the form of timestamps $TS_B$. Accordingly, the media stream A and the media stream B comprise different timeline information even though both are associated with a common play-out timeline. The media stream B 040 is shown to be delivered to UE 182.

FIG. 2 further shows a system for enabling correlating timeline information between the media stream A and the media stream B. The system comprises two Stream Monitors (SM), namely a stream monitor A 201 and a stream monitor B 202. In accordance with the present invention, each of said stream monitors may be arranged for providing identification information for a media stream by i) obtaining a persistent identification of one or more media samples of the media stream, the persistent identification being data which can be reproducibly obtained using the media stream, ii) determining a timestamp value associated with the persistent identification from timeline information comprised in the media stream, and iii) providing the timestamp value and the persistent identification of the one or more media samples as the identification information.

In particular, FIG. 2 shows the stream monitor A 201 providing identification information A 080 for the media stream A 020 and the stream monitor B providing identification information B 082 for the media stream B 040.

FIG. 2 further shows a correlation subsystem 300 being part of the earlier mentioned system for enabling correlating timeline information between the media stream A and the media stream B. The correlation subsystem 300 is shown to receive the identification information A 080 from the stream monitor A 201 and the identification information B 082 from the stream monitor B 202. In accordance with the present invention, the correlation subsystem may be arranged for combining the identification information A with the identification information B to enable correlating timeline information of the media stream A to timeline information of the media stream B. For that purpose, the correlation subsystem 300 may match a persistent identification of the media stream A to a persistent identification of the media stream B and thereby matching a timestamp value of the first media stream, e.g., one of the timestamps $TS_A$, to a timestamp value of the second media stream, e.g., one of the timestamps $TS_B$.

The following provides a more detailed example of the operation of the system. In this example, it is assumed that the stream monitor A and the stream monitor B provide the following timestamp values as part of their respective identification information:

Stream monitor A may provide a timestamp value A of 1:43:32.200, which is a regular clock format and which may increments as a regular clock as well.

Stream monitor B may provide a timestamp value B of 3,600,000, which is an RTP timestamp and for which the clock rate may be unknown.

The correlation subsystem 300 may then correlate both timestamp values by matching in time the associated persistent identifications. For example, correlation subsystem 300 may determine that persistent identifications A and B have a difference in play-out time of 4 seconds, where the media stream A is ahead. For that purpose, the correlation subsystem 300 may use additional identification information which comprises a plurality of persistent identifications and an associated plurality of play-out times on the common play-out timeline. Such additional identification information may have been obtained from one of the stream monitors A or B, or from a database comprising such identification information in predetermined form. Alternatively, the correlation subsystem 300 may match in time the persistent identifications A and B without such additional identification information. For example, if the persistent identifications A and B are same or similar, the correlation subsystem 300 may determine that both relate to same or similar play-out time. Also, the persistent identifications A and B may themselves be indicative of how they match in time.

Although for the timestamp value B of 3,600,000 the clock rate is not known, the timeline information of media stream A can nevertheless be correlated to the timeline information of media stream B, namely by subtracting the difference of 4 seconds from the timestamp value A, yielding a timestamp value of 1:43:28.200. Accordingly, it can be determined that a timestamp value of 1:43:28.200 for media stream A corresponds with a timestamp value of 3,600,000 for media stream B.

In certain cases, however, additional information may be needed such as a clock rate associated with a timestamp. In the following example, it is assumed that the stream monitor A and the stream monitor B provide the following timestamp values as part of their respective identification information:

Stream monitor A may provide a timestamp value A of 512,000

Stream monitor B may provide a timestamp value B of 1,312,000

Again, it is assumed that the persistent identifications A and B have a difference in play-out time of 4 seconds, where the media stream A is ahead. In order to correlate the above timestamp values A and B, the respectively used clock rates may be needed. This may be derived from, e.g., the used A/V profiles as determined by the stream monitors A 201 and/or B 202, or may be communicated to the correlation subsystem 300 by a UE. In this particular example, both streams are RTP streams carrying audio. As such, the correlation subsystem may determine that the clock rate of the media stream A is 16,000 and the clock rate of the media stream B is 8,000.

This additional information enable the timestamp values A and B to be correlated. Since the media stream A is ahead by 4 seconds, 4 seconds may be subtracted from the timestamp value A to correlate the two timestamps (or 4 seconds may added be to the timestamp value B). In the timeline information of media stream A, 4 seconds times 16,000 equals 64,000, so the timestamp value A of 512,000−64,000=448,000 is determined to correspond to the timestamp value B of 1,312,000.

In this respect, it is noted that timeline information may have a certain granularity, i.e. the contained timestamps or other timing data may have legal and illegal values. This information may also be used by the correlation subsystem 300, e.g., to round a calculated timestamp value to the closest legal value, taken into account the granularity of the timeline information and thus the timestamp.

FIG. 2 illustrates an output of the correlation subsystem 300, namely timing information 090, being used in synchronizing timed events with broadcast, and in particular, in triggering an application on a receiver, namely UE2 182, in synchronization with a media stream play-out on the receiver. Such synchronization is an example of a synchronization action. Other examples of synchronization actions which may be performed based on an output of the correlation subsystem 300 include a media stream buffering or skipping ahead to enable synchronized playback of one or media streams on a plurality of receivers and a media stream buffering or skipping ahead to enable synchronized playback of two or more media streams on a (single) receiver.

The synchronization of timed events with one or more broadcasted media stream is known per se. Such synchronization enables, e.g., quiz shows in which the users at home can play along by being enabled to see the questions at the same time as the contestants in the broadcast, and allowing them to play along. Such events may be indicated to a receiver by the broadcaster inserting the events, e.g., in the form of metadata, into the container carrying the media content, thereby linking the events directly to the media stream. However, such metadata may not pass through the various media distribution networks. Also, the quiz show play-along questions may be shown on a secondary device such as a tablet device, thereby requiring this secondary device to need synchronization with the primary display device such as a TV.

FIG. 2 shows an event server 350 which is arranged for indicating a certain event A at timestamp $TS_{A,1}$, i.e. a particular timestamp in media stream A, by providing event information 322 to the UE1 182 and the UE2 182. This event may correspond to a quiz question being asked in a television game show, or indicate that the time for submitting votes is ended. UE1 181 can directly act on this event at the proper time, as the timestamp $TS_{A,1}$ indicated by the event server 350 corresponds to those in media stream A. Here, the term 'corresponds to' refers to the timestamp $TS_{A,1}$ being expressed in terms of the timeline information of the received media stream, i.e., as another timestamp $TS_A$. Accordingly, the UE1 181 may directly and at the right time, i.e., in synchronization with the media stream play-out of media stream A, trigger an application on UE1 which, e.g., graphically presents a quiz question. UE2 182, however, is unable to directly use the event information 322. To enable the UE2 182 to use the event information 322 nevertheless, the correlation subsystem 300 is shown to provide correlation information 090 to the UE2 182 which enables the UE2 182 to translate the timestamp $TS_{A,1}$ into a timestamp $TS_{B,1}$ which corresponds to the timestamps $TS_B$ of the timeline information comprised in media stream B.

It will be appreciated that although the correlation subsystem 300 is shown to provide the correlation information 090 to the UE2 182, such information may also be provided to the event server 350. Accordingly, the event server 350 may be enabled to provide event information 322 to each of the receivers which corresponds to timestamps of the timeline information of the respective media streams, i.e., in the form of timestamp $TS_{A,1}$ to UE1 182 and in the form of timestamp $TS_{B,1}$ to UE2 182.

The present invention may be advantageously used to enable media synchronization in a segmented media distribution network. Here, the term segmented media distribution network refers to a media distribution network which comprises several segments which each distribute one or more media streams across.

Figure 3:
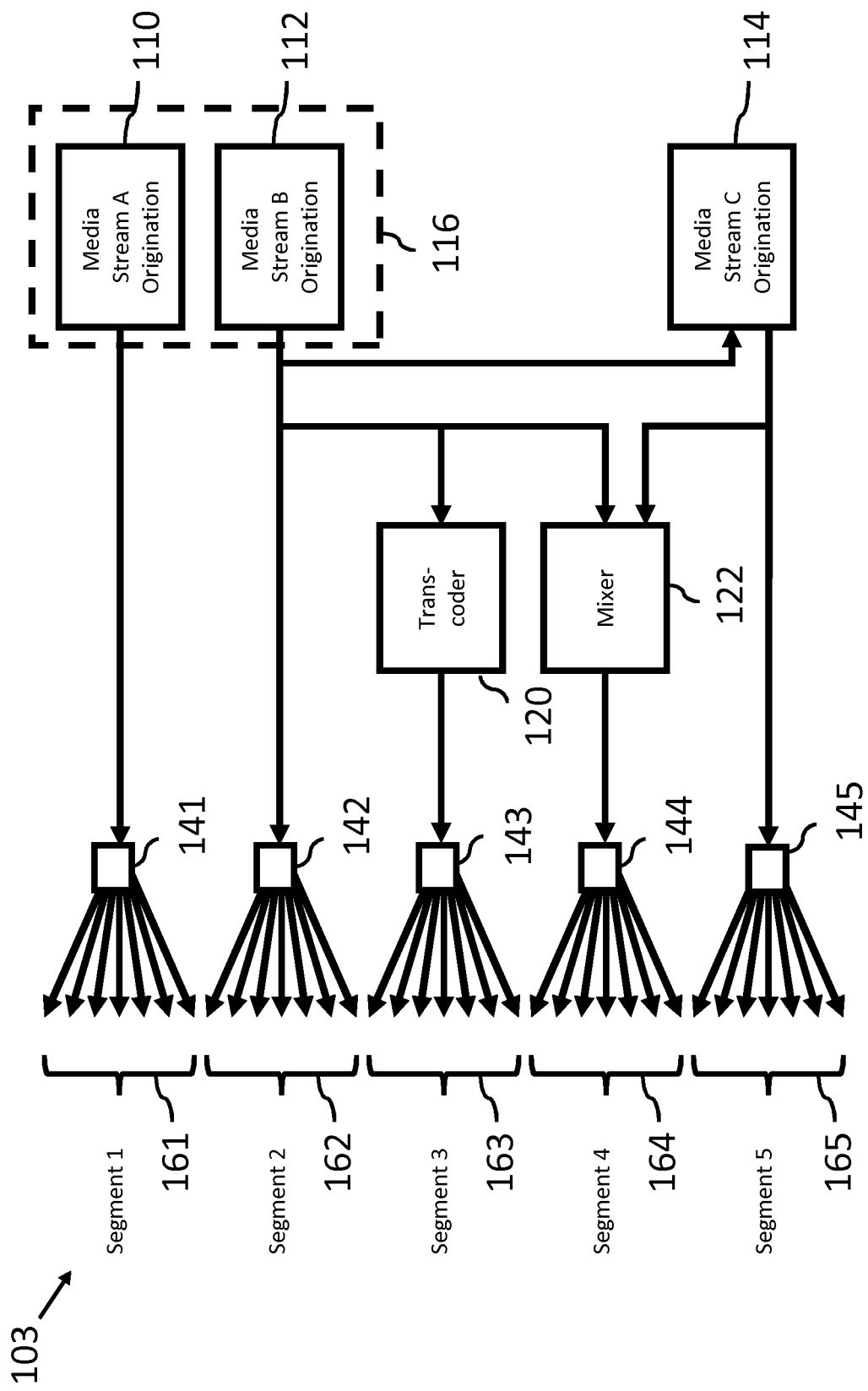
FIG. 3 illustrates a segmented media distribution network.

FIG. 3 shows an example of such a segmented media distribution network 103. The media distribution network 103 is shown to comprise media stream originators 110-114 and stream modifiers 120, 122 in the form of a transcoder 120 and a multiplexer 122. A difference with respect to the media distribution network of FIG. 1 is that in FIG. 3 the media streams are shown to be delivered to head-ends 141-145 of the media distribution network 103, with each of the head-ends acting as a distribution point for a plurality of devices, such as a plurality of receivers of respective end users. Accordingly, the head-end establish a number of segments 161-165 of the media distribution network 103 which each comprise a different plurality of devices. FIG. 3 shows a frequent configuration of such a media distribution network 103, in that the stream modifiers 120, 122 may be comprised in the media distribution network 103 upstream of the head-ends 141-145 rather than in or downstream of the head-ends.

The present invention may be applied to such a segmented media distribution network based on the assumption that the timeline information of a media stream in a respective segment is the same throughout substantially the entire segment, in particular when excluding such modifications in a receiver itself.

Figure 4:
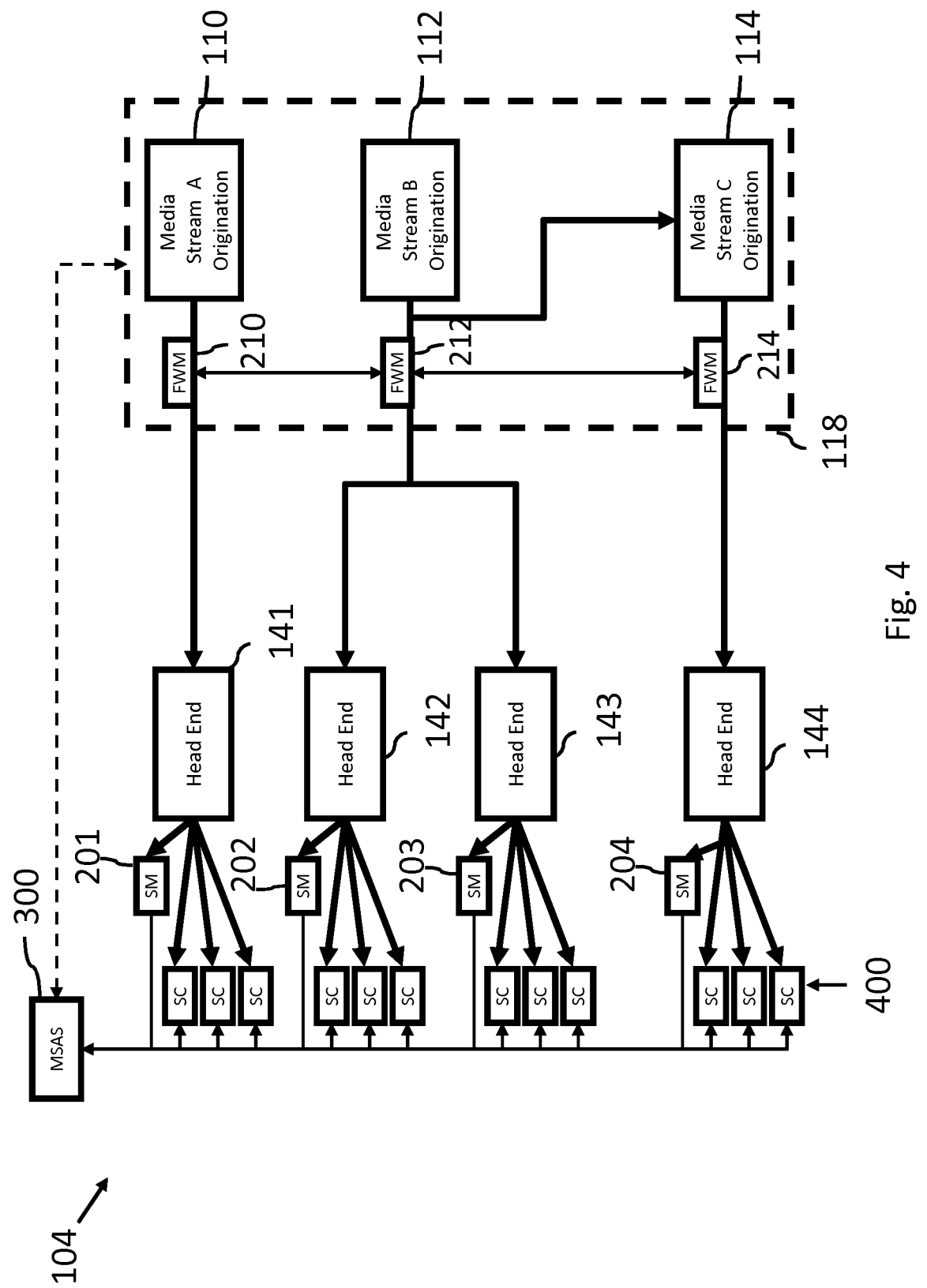
FIG. 4 shows a system according to the present invention within the context of such a segmented media distribution network.

FIG. 4 shows a result of this, in that FIG. 4 shows a system according to the present invention within the context of such a segmented media distribution network 104. Here, three media stream originations 110-114 and four head-ends 141-144 are shown. Each of the head-ends 141-144 serves a set of receivers which each comprise a synchronization client SC. For clarity reasons, FIG. 4 does not show the receivers themselves but rather only the synchronization clients 400 in each of the segments. Moreover, although each segment in FIG. 4 only comprises three synchronization clients and thus indicates the use of only three receivers, it will be appreciated that in practice, such a segment may also comprise a significantly larger number of receivers and associated synchronization clients. FIG. 4 further shows a stream monitor 201-204 placed in each of the segments, i.e., downstream of each of the head-ends 141-144.

The operation of the system within the context of FIG. 4 may be explained as follows. Each media stream may pass a persistent identification unit which obtains a persistent identification of one or more media samples of the respective media stream. The persistent identification units are indicated in FIG. 4 as Fingerprinting, Watermarking, and/or Marker (FWM) units 210-214. As shown in FIG. 4, the different FWM units 210-214 may communicate with each other and have a master wall clock, thereby enabling the persistent identifications to be related in time. Additionally or alternatively, there may be manual editorial control by a broadcaster or value-added-service provider to establish an exact synchronization between the media streams at the point of the FWM units 210-214. A FWM unit may employ fingerprinting to obtain the persistent identification(s). In this case, the FWM unit may passively monitor the media stream. A FWM unit may also employ watermarking or marking. In these cases, the FWM unit may actively place these (water)marks in the respective media stream. As a result, the FWM units 210-214 may provide a plurality of persistent identifications which correlate media samples from different segments that should be played out at the same time. Such information may be provided in the form of identification information to the correlation subsystem 300, as denoted in FIG. 4 by the dashed arrow. Such identification information may further comprise associated timestamps of the timeline information of the media streams, i.e., content timestamps. Effectively, each FWM unit 210-214 may constitute a stream monitor in that it may provide persistent identifications and associated timestamps of media samples of a media stream.

In each segment established by the head-ends 141-144, a stream monitor 201-204 is placed which obtains a persistent identification from the media stream which is delivered in each of the segments. The persistent identification may be matched in type to that of the FWM units 210-214. Each stream monitor 201-204 then provides identification information to the correlation subsystem 300 which comprises one or more persistent identifications and associated timestamps from the timeline information of the media stream. The correlation subsystem 300 may then combine this identification information to enable correlating the timeline information of the media streams in each of the segments, namely by matching in time a persistent identification of a media stream in one segment to a persistent identification of second media stream in another segment, thereby matching in time the associated timestamp values. Accordingly, the correlation subsystem 300 may be enabled to determine how the timestamps of the media streams correlate between the different segments.

It is noted that, although not shown in FIG. 4, in case the head-ends 141-144 receive different modified and/or unmodified versions of a same media stream, the FWM units may not be needed since a persistent identification from one segment may be directly matched in time to a persistent identification from another segment.

FIG. 4 shows the correlation subsystem 300 being comprised in a synchronization server, namely in a Media Synchronization Application Server (MSAS). The MSAS 300 and the synchronization clients 400 form a synchronization subsystem in that they enable a synchronization action to be performed with respect to a media stream. The MSAS 300 of FIG. 4 is shown to receive the identification information from the FWM units 210-214 and the synchronization monitors 201-204. The MSAS 300 may combine this information to generate timing information for one or more synchronization clients 400. For example, the timing information may comprise a timestamp expressed in terms of the timeline information from the media stream which a receiver is receiving, thereby enabling the one or more synchronization clients 400 to perform a synchronization action with respect to the received media stream.

As shown in FIG. 4 and in accordance with the present invention, it may suffice to provide only one or a limited number of stream monitors 201-204 compared to the number of synchronization clients 400 in each respective segment. If the MSAS 300 serves multiple segments, it may be needed for the MSAS 300 to determine to which segment a respective synchronization client 400 belongs. Here, it is noted that a segment may be defined within the MSAS 300 in relation to a stream monitor. Hence, it may not be needed for a stream monitor to be associated with a segment, but rather the synchronization clients to be associated with a stream monitor, thereby establishing the segments. Such information may be provided implicitly or explicitly by each synchronization client 400. For example, a synchronization client may report on a manually configured parameter, a parameter from an Electronic Program Guide (EPG), a parameter from the received stream, etc. An example of the latter may be the Synchronization Source, SSRC parameter from RTP streams. Alternatively, the MSAS 300 may detect a segment based on network addresses, routing information, etc.

The present invention has been previously described within the context of one or more media streams being streamed. However, such media streams may also accessed by a receiver in a non-streaming manner, e.g., by being accessed from a file.

Figure 5:
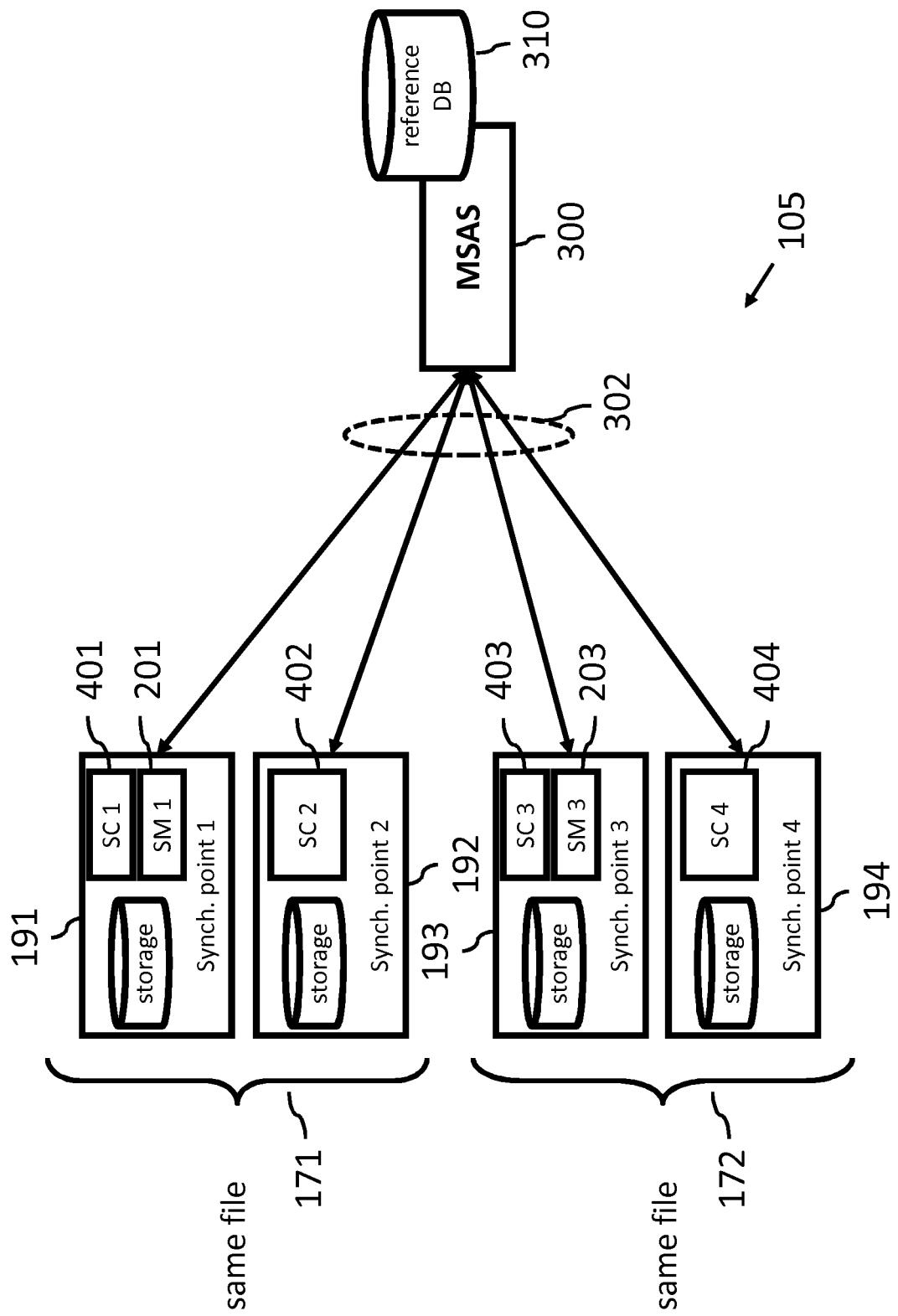
FIG. 5 shows a system according to the present invention within the context of receivers having file-based access to a media stream.

FIG. 5 shows a system according to the present invention within the context of receivers having file-based access to a media stream. This embodiment is based on the following use-case in which recorded media streams may be obtained in various ways. For example, a movie may recorded with a Personal Video Recorder (PVR) either at their own location (User-PVR) or using a recording functionality in the network (Network-PVR). The same movie may also be downloaded through, e.g., a Video on Demand (VoD) Internet service, or be obtained by purchasing a DVD or Blu-ray.

Although the timeline information of such differently sourced recordings may differ, there may be a need to enable the media streams of the recordings to be played-out synchronously, or in general, for timeline information to be correlated amongst such media streams. FIG. 5 illustrates this use-case by showing two clusters of each two receivers, namely a first cluster 171 comprising a first and second receiver 191, 192 and a second cluster 172 comprising a third and a fourth receiver 193, 194. The receivers 191, 192 in the first cluster 171 each have access to a first file and the receivers 193, 194 in the second cluster 172 each have access to a second file, i.e., by the respective files being stored in a local storage of each of the receivers. The first file and the second file may comprise different recordings of, e.g., a same movie, and as such each provide a different media stream. Accordingly, the media streams as comprised in the respective files may comprise different timeline information.

In the example of FIG. 5, the first receiver 191 and the third receiver 193 each comprise a stream monitor SM1, SM3, with each stream monitor being arranged for providing identification information for a media stream of a file by i) obtaining a persistent identification of one or more media samples of the media stream, ii) determining a timestamp value associated with the persistent identification from timeline information comprised in the media stream, and iii) providing the timestamp value and the persistent identification of the one or more media samples as the identification information.

In particular, FIG. 5 shows the stream monitor SM1 and the stream monitor SM3 providing the identification information to the MSAS 300. In order to match a first persistent identification from the media stream of the first file to a second persistent identification from the media stream of the second file, the MSAS 300 may access identification information comprising a plurality of persistent identifications and an associated plurality of play-out times on the common play-out timeline. The identification information may be comprised on a database 310, and may constitute reference identification information in that it may comprise, e.g., all fingerprints of one or more movies, video programs, etc. Accordingly, the MSAS 300 may match the first persistent identification in time to the second persistent identification of the second media stream, thereby matching a first timestamp value of the media stream of the first file to a second timestamp value of the media stream of the second file.

In order to obtain inter-destination media synchronization across the receivers, a synchronization client in each of the receivers may now report on their media reception and/or play-out timing based on the timestamps of the media stream of the file and, in response receive, timing information from the MSAS 300 enabling a synchronization action to be performed with respect to the respective media stream.

Similar to the segments of FIGS. 3 and 4, the MSAS 300 may need to determine to which cluster a receiver or its synchronization client belongs. Since a cluster may be defined within the MSAS 300 with respect to a streaming monitor 201, 203, in the example of FIG. 5 it may only be the second receiver 192 and the fourth receiver 194 which may need to provide information allowing the MSAS 300 to identify whether a respective receiver is located in the first cluster 171 comprising the stream monitor SM1 or in the second cluster 172 comprising the stream monitor SM2. Such information may be provided by the synchronization client 402, 404 of each receiver, e.g., by providing details such as, when recording a TV program, the TV program being recorded, the EPG used to program the recording, the type of recorder, the TV provider, recorded pre-show timing settings, etc. If the file is downloaded from a VoD provider, the provider may be indicated together with the identification of the content item downloaded. If the file is obtained from a DVD or Blu-ray disc, the content item together with other identifiers on the disc may be used. Other information includes the exact length of the content, the used codecs, available EPG information, etc.

It will be appreciated that the example of FIG. 5 may be advantageously applied to the IPTV environment as in an IPTV provider's domain, there may be only a limited number of different types of receivers, i.e., set-top boxes. As such, only a few receivers may need to provide identification information, e.g., only one receiver of each different type needs to comprise a stream monitor, with such information subsequently being used to provide timing information for all other receivers of the same type.

A method in accordance with the present invention may enable correlating timeline information between a first media stream and a second media stream, the first media stream and the second media stream being both associated with a common play-out timeline, said correlating being based on identification information obtained from at least two stream monitors, each of said stream monitors being arranged for providing identification information for a media stream by:

i) obtaining a persistent identification of one or more a media samples of the media stream, the persistent identification being data which can be reproducibly obtained using the media stream, ii) determining a timestamp value associated with the persistent identification from timeline information comprised in the media stream, and iii) providing the timestamp value and the persistent identification of the one or more media samples as the identification information.

The method may comprise, in a first step titled "OBTAINING IDENTIFICATION INFORMATION FOR FIRST MEDIA STREAM", obtaining first identification information for the first media stream from a first stream monitor of the at least two stream monitors. The method may further comprise, in a second step titled "OBTAINING IDENTIFICATION INFORMATION FOR SECOND MEDIA STREAM" obtaining second identification information for the second media stream from a second stream monitor of the at least two stream monitors. The method may further comprise, in a third step titled "COMBINING THE IDENTIFICATION INFORMATION TO ENABLE CORRELATING TIMELINE INFORMATION BETWEEN BOTH MEDIA STREAM", combining the first identification information with the second identification information to enable correlating timeline information of the first media stream to timeline information of the second media stream by matching a first persistent identification of the first media stream to a second persistent identification of the second media stream and thereby matching a first timestamp value of the first media stream to a second timestamp value of the second media stream.

It is noted that the first step and the second step may be performed in any suitable order as well as simultaneously. Moreover, either or both of the first step and the second step may be repeatedly performed, thereby enabling during the third step the matching to be performed by matching a first persistent identification to a plurality of persistent identifications, thereby identifying the second, i.e., matching, persistent identification, or vice versa. The steps of the method may be performed by one or more entities comprised in a media distribution network, including receivers which may form end-points of the media distribution network. Moreover, a computer program product may comprise instructions for causing a processor system to perform the method. The computer program product may also be distributed, in that different instructions may be provided to cause different processor systems to jointly perform the method.

It is noted that, in general, the persistent identifications as obtained by the stream monitors may be comprised of a fingerprint, a watermark or a marker, or a combination of said persistent identifications, but are not limited to these examples.

In this respect, it is noted that the term 'fingerprinting' refers to a technique which is known per se from the field of computer science, and which attempts to uniquely identify, i.e., establish an identity, of a relatively large amount of data using a relatively small amount of data, i.e., the fingerprint. For example, hashes of the large amount of data or even (small) ranges thereof may be used. The stream monitors may make use of such known techniques, such as video fingerprinting and/or audio fingerprinting. The fingerprinting may be on the basis of a specific media sample, e.g., a video frame, an audio sample, a time-text-sample, etc, or of a (short) range of media samples, e.g. a few seconds of audio or a number of consecutive video frames. Accordingly, the fingerprinting may need to be repeated regularly if it is desired to match an arbitrary fingerprint in time to another arbitrary fingerprint. Alternatively, fingerprints may be directly compared with each other to determine if they match and thus relate to a same play-out time. The term 'watermarking' refers to a technique which is known per se from the field of computer science as well. Also watermarking may be needed to be repeated regularly. The term 'marker' refers to markers which are included in the media stream in a persistent manner, such as digital markers in the codec, markers in the MPEG-TS, markers in RTP or RTCP, etc.

In general, a stream monitor may be a separate entity within the media distribution network. In particular, the stream monitor may be placed in or near an origin of a segment such as a head-end. The stream monitor may also be co-located with a synchronization client. The stream monitor may also be implemented as a software component in a plurality of synchronization clients but activated once or a limited number of times per segment, etc. Also, if synchronization clients can receive multiple streams in the same segment, e.g. in an IPTV segment, different clients may each perform the monitoring function for different streams, e.g., for different TV channels.

The stream monitor may report the identification information to a correlation subsystem in the MSAS. The stream monitor may also report the identification information to a correlation subsystem comprised in a synchronization client. The stream monitor may provide the identification information to the correlation subsystem at regular intervals. The identification information may be extrapolated from earlier identification information. The identification information may also be provided only at discontinuities in timestamps or in other timing data, e.g., each time a new program is started or when the current program is interrupted by an interstitial.

In general, the correlation subsystem may be a separate entity within the media distribution network. The correlation subsystem may extrapolate identification information to preceding or subsequent media samples from earlier obtained identification information. The correlation subsystem may relay the identification information to the synchronization clients in the Hybrid TV use-case. The correlation subsystem may also use the identification information to generate timing information for the synchronization clients in the Social TV and Companion Screen use-cases. The correlation subsystem may be embodied as a distributed system with multiple interconnecting, possibly hierarchically arranged MSASes. The correlation subsystem may be enabled to assign a synchronization client to a segment based on manual configuration. The correlation subsystem may also be enabled to assign a synchronization client to a segment based on a signaling solution.

It is further noted that the examples in this application follow the so-termed synchronization maestro scheme (SMS, a client-server model). However, the present invention is also applicable to other synchronization schemes such as a distributed control scheme (DCS) or a master-slave scheme, as discussed in the earlier mentioned article "*Multimedia group and inter-stream synchronization techniques: A comparative study*" by F. Boronat et al., Elsevier Information Systems, 34, 2009, pp. 108-131.

In general, it is noted that synchronization does not always have to be entirely accurate. For example, in the use-case of social TV, a play-out timing difference of a few 100 ms and even up to 1 or 2 seconds may not be noticed by users. However, in case of local synchronization of several media streams, either on one device such as a Hybrid Broadcast Broadband TV (HbbTV) or on a TV and a companion screen, more accurate synchronization may be needed. Yet even in these use-cases, lip sync errors remain undetectable up to approximately 120 ms (between 100 ms video on front to about 30 ms audio in front). Therefore, it will be appreciated that within the context of the present invention, the term 'media synchronization' may refer to a degree of synchronization which achieves a satisfactory end-user experience.

Moreover, such entirely accurate synchronization can only be carried out on play-out timing, i.e. report and influence the actual time media is presented to the user. However, this timing is not always available. There are other points on which to report timing or to influence timing, i.e., any point addressable in the content chain in the receiver device would do. This can be from the moment the content is received (packet receipt times), packet processed, packet decoded, etc. Where in this text timing is discussed for synchronization purposes, any of these timings is applicable.

It will be appreciated that the present invention may be advantageously used to implement media synchronization in HbbTV-TF-Media and DVB-TM-COS. Here, delays throughout a media distribution network may be managed as follows. A broadcaster may coarsely equalize delays between segments of the media distribution network by providing a stream monitor per network segment per channel and a variable buffer per network segment per channel. Moreover, fine synchronization may be provided in/between TV and Companion Screen. The broadcaster may correlate a delivered content timeline with an original content timeline based on fingerprinting or watermarking of the original media stream and stream monitors reporting on the fingerprint or watermark of delivered media stream per network segment.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for enabling correlating timeline information between a first media stream and a second media stream, the first media stream and the second media stream being both associated with a common play-out timeline and the first media stream and the second media stream comprising different timeline information comprising different timestamps, the system comprising:
   at least two stream monitor devices, each of said stream monitor devices being arranged for providing identification information for a media stream by:
   i) obtaining a persistent identification of one or more media samples of the media stream, the persistent identification being reproducible based on the one or more media samples,
   ii) obtaining a timestamp value associated with the persistent identification from timeline information comprised in the media stream, and
   iii) providing the timestamp value and the persistent identification of the one or more media samples as the identification information;
   wherein the at least two stream monitor devices comprise a first stream monitor device for providing first identification information for the first media stream and a second stream monitor device for providing second identification information for the second media stream; and a correlation subsystem for combining the first identification information with the second identification information to enable correlating timeline information of the first media stream to timeline information of the second media stream by matching a first persistent identification of the first media stream to a second persistent identification of the second media stream and, by matching the first persistent identification to the second persistent identification, matching a first timestamp value comprised in the first media stream to a second timestamp value comprised in the second media stream correlating the timeline information between the first media stream and the second media stream, and providing timing information for enabling a synchronization subsystem for performing a synchronization action with respect to the second media stream based on the timeline information of the first media stream.

2. The system according to claim 1, wherein the second media stream is a modified version of the first media stream, said modified version comprising timeline information which differs from the timeline information of the first media stream.

3. The system according to claim 2, wherein the first media stream is distributed via a media distribution network, wherein the media distribution network comprises a stream modifier for generating the modified version of the first media stream, and wherein the first stream monitor device is comprised in the media distribution network upstream of the stream modifier and the second stream monitor device is comprised in the media distribution network downstream of the stream modifier.

4. The system according to claim 1, wherein the correlation subsystem is arranged for matching the first persistent identification to the second persistent identification based on third identification information linking the first persistent identification and the second persistent identification to the common play-out timeline.

5. The system according to claim 4, wherein the first media stream and the second media stream are part of a composite of media streams comprising common timeline information, and wherein the system further comprises a third stream monitor device for providing said third identification information for the composite of media streams.

6. The system according to claim 1, wherein the second media stream is distributed via a media distribution network, wherein the media distribution network further comprises the synchronization subsystem.

7. The system according to claim 1, wherein the synchronization action is one of the group of:
a media stream buffering or skipping ahead to enable synchronized playback of the first media stream and/or the second media stream on a plurality of receivers,
a media stream buffering or skipping ahead to enable synchronized playback of the first media stream with the second media stream on a receiver, and
a triggering of an application on a receiver in synchronization with a media stream play-out on the receiver.

8. The system according to claim 6, wherein the synchronization subsystem comprises a synchronization server and a plurality of synchronization clients, wherein the plurality of synchronization clients is comprised in a segment of the media distribution network which is arranged for distributing the second media stream, and wherein the second stream monitor device is comprised in the segment amongst the plurality of synchronization clients.

9. The system according to claim 8, wherein the correlation subsystem is arranged for providing the timing information to the plurality of synchronization clients in the segment for enabling said synchronization clients to perform the synchronization action with respect to the second media stream based on a monitoring of the second media stream by the second stream monitor device.

10. The system according to claim 1, wherein the persistent identification is one of the group of: a fingerprint, a watermark and a marker, of the one or more media samples.

11. Media distribution network comprising the system according to claim 1.

12. Method for enabling correlating timeline information between a first media stream and a second media stream, the first media stream and the second media stream being both associated with a common play-out timeline and the first media stream and the second media stream comprising different timeline information comprising different timestamps, said correlating being based on identification information obtained from at least two stream monitor devices, each of said stream monitor devices being arranged for providing identification information for a media stream by:
i) obtaining a persistent identification of one or more media samples of the media stream, the persistent identification being the persistent identification being reproducible based on the one or more media samples,
ii) obtaining a timestamp value associated with the persistent identification from timeline information comprised in the media stream, and
iii) providing the timestamp value and the persistent identification of the one or more media samples as the identification information;
and the method comprising:
obtaining first identification information for the first media stream from a first stream monitor device of the at least two stream monitor devices;
obtaining second identification information for the second media stream from a second stream monitor device of the at least two stream monitor devices;
combining the first identification information with the second identification information to enable correlating timeline information of the first media stream to timeline information of the second media stream by matching a first persistent identification of the first media stream to a second persistent identification of the second media stream and, by matching the first persistent identification to the second persistent identification, matching a first timestamp value comprised in the first media stream to a second timestamp value comprised in the second media stream, correlating the timeline information between the first media stream and the second media stream, and providing timing information for enabling a synchronization subsystem for performing a synchronization action with respect to the second media stream based on the timeline information of the first media stream.

13. A non-transitory computer readable medium comprising instructions for causing a processor system to perform the method according to claim 12.

14. A stream monitor device for use in a system for enabling correlating timeline information between a first media stream and a second media stream, the first media stream and the second media stream being both associated with a common play-out timeline and the first media stream and the second media stream comprising different timeline information comprising different timestamps, and the system comprising:
- at least two stream monitor devices, wherein the at least two stream monitor devices comprise a first stream monitor device for providing first identification information for the first media stream and a second stream monitor device for providing second identification information for the second media stream; and
- a correlation subsystem for combining the first identification information with the second identification information to enable correlating timeline information of the first media stream to timeline information of the second media stream by matching a first persistent identification of the first media stream to a second persistent identification of the second media stream and, by matching the first persistent identification to the second persistent identification, matching a first timestamp value comprised in the first identification information of the first media stream to a second timestamp value comprised in the second identification information of the second media stream, correlating the timeline information between the first media stream and the second media stream, and providing timing information for enabling a synchronization subsystem for performing a synchronization action with respect to the second media stream based on the timeline information of the first media stream;
- wherein each of said stream monitor devices is arranged for providing identification information for a media stream by:
  - i) obtaining a persistent identification of one or more media samples of the media stream, the persistent identification being reproducible based on the one or more media samples,
  - ii) obtaining a timestamp value associated with the persistent identification from timeline information comprised in the media stream, and
  - iii) providing the timestamp value and the persistent identification of the one or more media samples as the identification information.

15. A correlation subsystem for use in a system for enabling correlating timeline information between a first media stream and a second media stream, the first media stream and the second media stream being both associated with a common play-out timeline and the first media stream and the second media stream comprising different timeline information comprising different timestamps, and the system comprising:
- at least two stream monitor devices, each of said stream monitor devices being arranged for providing identification information for a media stream by:
  - i) obtaining a persistent identification of one or more media samples of the media stream, the persistent identification being reproducible based on the one or more media samples,
  - ii) obtaining a timestamp value associated with the persistent identification from timeline information comprised in the media stream, and
  - iii) providing the timestamp value and the persistent identification of the one or more media samples as the identification information;
  - wherein the at least two stream monitor devices comprise a first stream monitor device for providing first identification information for the first media stream and a second stream monitor device for providing second identification information for the second media stream; and
- the correlation subsystem;

wherein the correlation subsystem is arranged for combining the first identification information with the second identification information to enable correlating timeline information of the first media stream to timeline information of the second media stream by matching a first persistent identification of the first media stream to a second persistent identification of the second media stream and, by matching the first persistent identification to the second persistent identification, matching a first timestamp value comprised in the first identification information of the first media stream to a second timestamp value comprised in the second identification information of the second media stream, correlating the timeline information between the first media stream and the second media stream, and providing timing information for enabling a synchronization subsystem for performing a synchronization action with respect to the second media stream based on the timeline information of the first media stream.

* * * * *

UNITED STATES PATENT AND TRADEMARK OFFICE
CERTIFICATE OF CORRECTION

PATENT NO. : 10,694,264 B2  
APPLICATION NO. : 15/022863  
DATED : June 23, 2020  
INVENTOR(S) : Van Deventer et al.

Page 1 of 1

It is certified that error appears in the above-identified patent and that said Letters Patent is hereby corrected as shown below:

On the Title Page

Under item (73) Assignees:  
Please delete: "KONINKLIJKE KPN N.V., Rotterdam(NL); Nederlandse Organisatie Voor Toegpast-Natuurwetenschappelijk Onderzoek TNO, 's-Gravenhage (NL)"

Please add: --KONINKLIJKE KPN N.V., Rotterdam (NL); Nederlandse Organisatie Voor Toegepast-Natuurwetenschappelijk Onderzoek TNO, 's-Gravenhage (NL)--.

Signed and Sealed this  
Twenty-fifth Day of August, 2020

Andrei Iancu  
*Director of the United States Patent and Trademark Office*